US005220659A

United States Patent [19]

Larson et al.

[11] Patent Number: 5,220,659

[45] Date of Patent: Jun. 15, 1993

[54] SYSTEM FOR MATCHING DATA RECOVERY TIME BETWEEN DIFFERENT DEVICES BY EXTENDING A CYCLE UPON DETECTING END OF CYCLE

[75] Inventors: Ronald J. Larson, Minneapolis; Jeffry V. Herring, Bloomington, both of Minn.

[73] Assignee: Micral, Inc., New Brighton, Minn.

[21] Appl. No.: 409,435

[22] Filed: Sep. 18, 1989

[51] Int. Cl.[5] .................. G06F 13/14; G06F 13/20; G06F 13/372

[52] U.S. Cl. .................. 395/500; 395/550; 395/325; 395/800; 364/DIG. 2; 364/950.2; 364/950.4; 364/950.5

[58] Field of Search .................. 395/500, 550, 800, 325

[56] References Cited

U.S. PATENT DOCUMENTS 3,975,712 8/1976 Hepworth et al. ............ 340/147 R
4,499,536 12/1985 Gemma et al. ............ 364/200
4,631,702 12/1986 Korba ............ 364/900
4,663,730 5/1987 Ikeda ............ 364/900
4,910,671 3/1990 Kitamura et al. ............ 364/200
4,981,296 1/1991 Shiraishi et al. ............ 273/1
5,032,982 7/1991 Dalrymple et al. ............ 364/200
5,065,313 11/1991 Lunsford ............ 395/275
5,081,701 1/1992 Silver ............ 395/325
5,111,424 5/1992 Donaldson et al. ............ 395/725

*Primary Examiner*—Thomas C. Lee
*Assistant Examiner*—Thomas S. Taylor
*Attorney, Agent, or Firm*—Kinney & Lange

[57] ABSTRACT

A controller for interfacing bus-coupled peripheral devices with a microcomputer is described. The controller provides generalized compensation for variations in peripheral device access recovery time and for differences in access recovery times among peripheral devices, central processing units and input/output buses.

16 Claims, 6 Drawing Sheets

DATA
INTERRUPTS
ADDRESS
ADDRESS DECODING
101
COMMAND PROCESSING
102
MCA CTL
INT CTL MASTER
104
INT CTL SLAVE
105
PAR PRINT
106
10
R 0092
R 0091
R 0070
R 0061
R 0103
R 0102
R 0096
R 0094
108
PAR PNT PORT
CTL SIGNALS
AUDIO
SYSTEM TIC
NMI
AUDIO TIMER A
SYS INT TIMER B
WATCH DOG TIMER C
103
BUS INTERFACE
107

DATA
INTERRUPTS
ADDRESS
MCA CTL
ADDRESS DECODING
101
COMMAND PROCESSING
102
INT CTL MASTER
104
INT CTL SLAVE
105
AUDIO TIMER A
SYS INT TIMER B
103
WATCH DOG TIMER C
PAR PRINT
106
10
R 0092
R 0091
R 0070
R 0061
R 0103
R 0102
R 0096
R 0094
108
PAR PNT PORT
CTL SIGNALS
AUDIO
SYSTEM TIC
NMI
BUS INTERFACE
107

PERRDY
U212
ANB4DI
AN4
U210
DFCTNB
FD2
U211
DFCTNB
FD2
U208
U209
FD2-DFCTNB
U207
NDB2DI
ND2
U206
INBIDI
IV
U204
NDBBDI
NDB
U205
DRB2DI
DR2
U201
INBIDI
IV
U202
INBIDI
IV
U203
INBIDI
IV
DEC007X
TIM2CSN
TIMICSN
DEC0071
DEC0070
KYBDCSN
ICLKI4M
CLK 28M

IORDN
IOWRN
UI341
UI345
DRB2DI
DR2
UI316
UI314
ND2-NDB2DI
NDB3DI
ND3
LAT3
D2Q2
DI QI
DOQO
EMA
RST
UI323
UI305
UI307
UI306
NR2-NRB2DI
UI346
INBIDI
IV
UI322
IV-INBIDI
UI303
UI304
UI354
DC24DI
D24L
STBDLY
ICSIN
ICSON
ICMEM
SYSRST9N
COMMAND
IGATEC

SYSTEM FOR MATCHING DATA RECOVERY TIME BETWEEN DIFFERENT DEVICES BY EXTENDING A CYCLE UPON DETECTING END OF CYCLE

BACKGROUND AND SUMMARY OF THE INVENTION

The present invention relates to microcomputer systems incorporating commercially available peripheral device controllers. In particular, this invention relates to microcomputers in which a peripheral device controller is used for controlling data flow and address and data timing between peripheral devices, such as keyboard, printers and disk drives, and the microprocessor via the main input/output (I/0) bus of the microcomputer system.

While present-day microcomputer manufacturers have control over the design and configuration of the systems they produce, they typically must anticipate the parameters necessary for compatibility of their system with new ancillary devices, including add-on peripherals, accessories and memory options produced by other manufacturers. The performance and interface characteristics of microprocessors and memory devices often vary substantially from one release of the same device to the next; similarly, such characteristics of peripherals, accessories and memory options will also vary substantially among the manufacturers of these devices.

The performance characteristics of peripheral devices are often designed for less than optimum performance, i.e., "detuned" to accommodate variations in microcomputer system designs. Microprocessor chip and memory devices, however, are not usually so detuned. Therefore, the manufacturer of high performance microcomputers must allow for different, even inferior, performance characteristics of peripheral, accessory devices and some memory options in order to produce a system which is compatible with the maximum number of devices attachable to the system. In addition, the microcomputer manufacturer must anticipate upgrades and changes of microprocessor chip sets and memory devices. If the microcomputer manufacturer does not so anticipate such upgrades, it will limit the marketability of the system to less than the total market available for his product.

A complete microcomputer, which is often intended for desktop applications, includes subsystems such as a central processing unit (hereafter referred to as the "CPU", "processor" or "microprocessor"), a math "coprocessor", DMA capabilities, memory, an input/output (I/O) bus, miscellaneous system ports, and separate interface logic for peripheral devices such as video, keyboard, floppy disks, serial and parallel ports for printers, scsi devices, a mouse pointing device and the like.

The microcomputer functions by manipulating address, data, and control signals among the subsystems within the system. The control data flow into and out of peripheral devices is provided by various controllers which usually controls the data flow and timing between the processor, main system memory, and the main I/O bus.

Most keyboard controllers incorporated into state-of-the-art microcomputer systems require compensation for access recovery time. The requirement for such compensation arises because keyboard controllers incorporate technology in which the response time for processing signals representing access commands is slower than present I/O bus technology is designed to accommodate. For example, the typical minimum recovery time between any two operations performed by state-of-the-art bus technology is 100 ns, but the recovery time required by present keyboard controllers is 1000 ns. Thus, the I/O bus is ready for the next operation long before the keyboard controller is ready to process it.

In the past, computer programs supplied with keyboard controllers provided such access recovery time compensation as part of the program code. However, such a software-based accommodation for access recovery time is generally regarded as inefficient and may not operate at all in a microcomputer system having a cached microprocessor.

Peripheral device control in a microcomputer system according to the present invention comprises an asynchronous controller for interfacing peripheral devices with present state-of-the-art I/O bus technology, such as the Micro Channel Architecture (MCA) manufactured by IBM Corporation, and state-of-the-art microprocessors, such as the 80386 microprocessor, manufactured by Intel Corporation. Accordingly, many special functions previously supported by separate peripheral device controllers are consolidated into one controller to reduce system size and cost.

One embodiment of the peripheral device controller of the present invention comprises programmable registers and counters that receive and transmit data over the MCA. The functional sections include, interrupt controllers, counter timers, parallel printer port, address decode, micro channel command processing, misc. system registers, pos registers, clock generation circuits, and assembly of information for transmission on the system data bus.

During initialization and normal operation, the microprocessor reads from and writes to any one of several I/O port addresses provided by the device of the present invention. Addressable functions include interrupt control, programmable counters, option and configuration (POS), refresh rate counter, parallel port control and address decoding for several I/O ports.

In addition, the controller of the present invention incorporates compensation for keyboard access recovery time as a generalized hardware function. Thus selectable recovery time compensation for other peripheral devices as may be required in addition to the keyboard is provided.

DESCRIPTION OF THE PREFERRED EMBODIMENT

Figure 1:
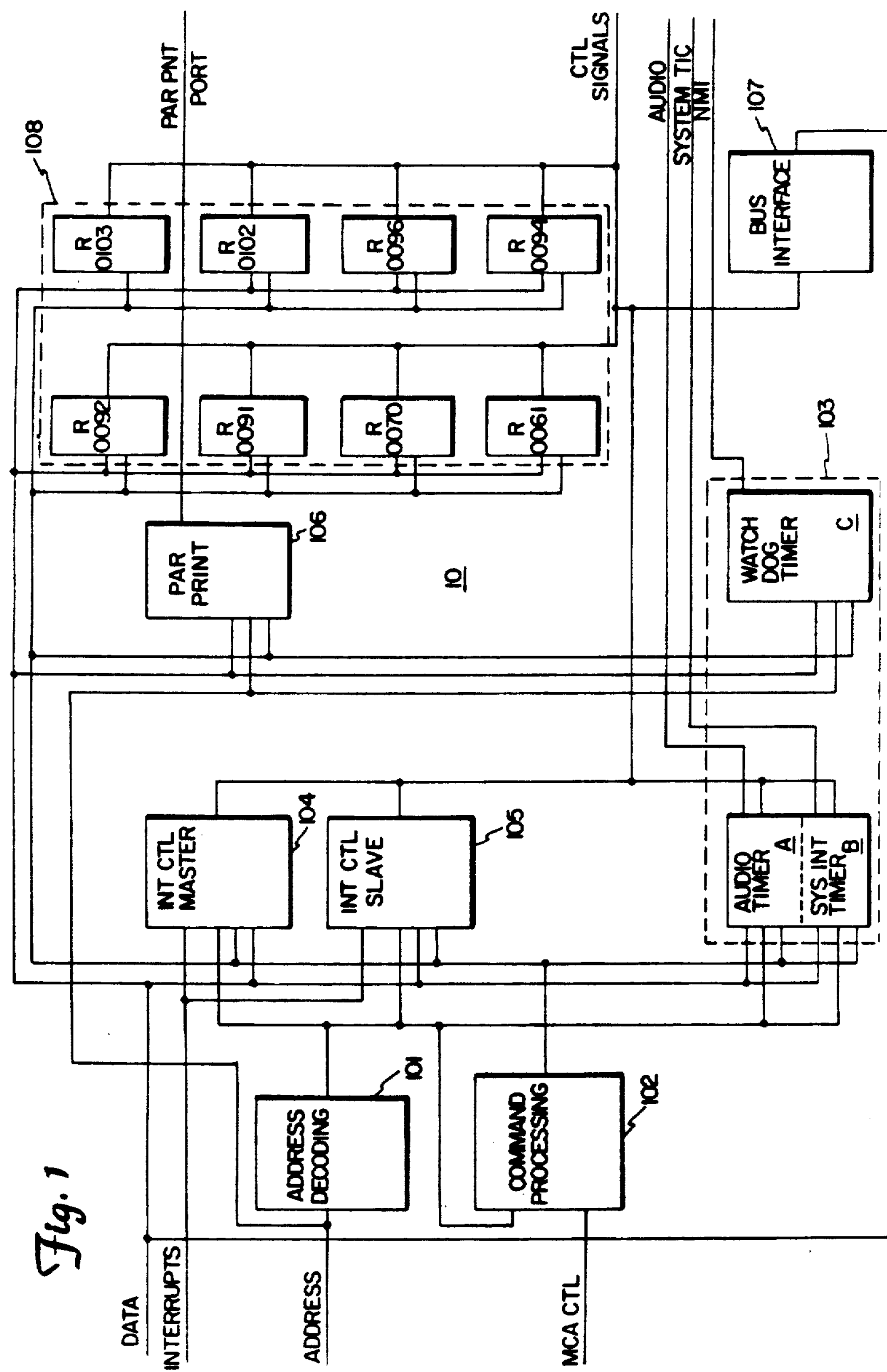
FIG. 1 is a block diagram of a microcomputer peripheral device controller constructed according to the principles of the present invention.

Peripheral device controller 10, constructed according to the present invention as shown in FIG. 1, comprises address decoding section 101, command processing section 102, timer section 103, interrupt control section 104, parallel printer port 106, bus interface 107 and register section 108. When communicating with an 80386 microprocessor via the MCA, peripheral device controller 10 is treated as an 8-bit I/O device.

Address decoding section 101 provides address information that the registers comprising register section 108 require for proper access. An address decode map is provided in Table 1.

Device controllers, such as a keyboard controller, may form part of address decoding section 101. However, the address decoding function of section 101 also may be performed by a decoder separate from the controller of the present invention and thus forms no part of the present invention.

Command processing section 102 interfaces the MCA with local or system board peripheral controllers for peripherals such as floppy disk drives and the keyboard. Command processing section 102 incorporates logic, described elsewhere in this specification, which provides access recovery time for the keyboard and for other peripherals as required.

With continuing reference to FIG. 1, timer section 103 comprises three programmable timers. These timers are functionally compatible with and operate in similar to an 8254 programmable timer manufactured by Intel Corporation. Watchdog timer 103C is merely an 8-bit counter.

Interrupt control for the system is provided by master and slave interrupt control sections 104 and 105, respectively. An interrupt assignment map is given in Table 1.

TABLE 1

| SLAVE INTERRUPTS (priority #2) | |
|---|---|
| INTERRUPT #15: | Not assigned. |
| INTERRUPT #14: | Fixed disk. |
| INTERRUPT #13: | Math processor extention. |
| INTERRUPT #12: | Mouse device. |
| INTERRUPT #11: | Not assigned. |
| INTERRUPT #10: | Not assigned. |
| INTERRUPT #9: | Not assigned. |
| INTERRUPT #8: | Real time clock |
| MASTER INTERRUPTS: | |
| INTERRUPT #7: | Printer port. |
| INTERRUPT #6: | Floppy disk. |
| INTERRUPT #5: | Not assigned. |
| INTERRUPT #4: | Serial port. |
| INTERRUPT #3: | Serial port. |
| INTERRUPT #2: | See interrupts 8:15. |
| INTERRUPT #1: | Keyboard. |
| INTERRUPT #0: | System timer tic. |

Peripheral device controller 10 includes registers associated with a parallel printer port and provides the timing signals necessary to interface the MCA with peripheral port circuitry. Parallel printer port 106 is bi-directional to facilitate data transfers into and out of the microcomputer at a faster rate than provided by the serial port.

Bus interface 107 assembles bit information and transfers such information to the MCA via an 8-bit local peripheral bus. All of the bits in a byte of information may not be defined. In such instances, undefined bits are tri-stated, or simply not driven by this portion of peripheral device controller 10. Thus, bit information may be easily modified or enhanced external to peripheral device controller 10.

Finally, in addition to miscellaneous system registers, register section 108 includes configuration registers for software configuration of plug-in adapters as well as other peripheral device functions not provided on the internal system board of the microcomputer. A detailed bit map is provided in Table 2.

TABLE 2

REGISTER DEFINITIONS:
This section contains the READ decode bit assignments.

| Reg. | Bits 7-0 | | | |
|---|---|---|---|---|
| 0020 | INTERRUPT CONTROLLER #1 | | | |
| 0021 | INTERRUPT CONTROLLER #1 | | | |
| 0040 | COUNTER-TIMER #0 | | | |
| 0042 | COUNTER-TIMER #2 | | | |
| 0044 | COUNTER-TIMER #3 | | | |
| 0060 | EXTERNAL DECODE >KEYBOARD | | | |
| 0061 | BIT 7 | BIT 6 | BIT 5 | BIT 4 |
| | mem par ck | io ch ck | cnt-tim 2 out | ref det |
| | BIT 3 | BIT 2 | BIT 1 | BIT 0 |
| | io ck enan | m par enan | spkr ena | c-t 2 gate |
| Reg. | Bits 7-0 | | | |
| 0064 | EXTERNAL DECODE > KEYBOARD | | | |
| 0071 | EXTERNAL DECODE > REAL TIME CLOCK/RAM | | | |
| 0076 | EXTERNAL DECODE > RAM DATA | | | |
| | BIT 7 | BIT 6 | BIT 5 | BIT 4 |
| 0091 | | | | |
| 0092 | litea | liteb | | wd timeout |
| 0094 | mb setupn | | vga setupn | |
| 0096 | ch rst | | | |
| | BIT 3 | BIT 2 | BIT 1 | BIT 0 |
| 0091 | | | | cdsel fdbk |
| 0092 | psswd lock | | a20 gate | alt pro rst |
| 0094 | | | | |
| 0096 | ch setup en | ch su 2 | ch su 1 | ch su 0 |
| Reg. | Bits 7-0 | | | |
| 00A0 | INTERRUPT CONTROLLER #2 | | | |
| 00A1 | INTERRUPT CONTROLLER #2 | | | |
| 0101 | EXTERNAL DECODE > ID CODE | | | |

TABLE 2-continued

| | | | | |
|---|---|---|---|---|
| 0102 | BIT 7 | BIT 6 | BIT 5 | BIT 4 |
| | pp mode | pp sel 1 | pp sel 0 | pp ena |
| | BIT 3 | BIT 2 | BIT 1 | BIT 0 |
| | altserpn | sp ena | fd ena | mb ena |
| Reg. | Bits 7-0 | | | |
| 0103 | EXTERNAL DECODE > RAM CONFIGURATION | | | |
| 0278(0378/03bc) | PAR PORT DATA | | | |
| | BIT 7 | BIT 6 | BIT 5 | BIT 4 |
| 0279(0379/03bc) | ppbusyn | ppackn | pppapend | ppselin |
| 027a(037a/03be) | | | irqena | ppselout |
| | BIT 3 | BIT 2 | BIT 1 | BIT 0 |
| | pperm | lirq7n | | |
| | ppinitn | ppautofd | ppstrobe | |
| Reg. | Bits 7-0 | | | |
| 02F8(0318)- | EXTERNAL DECODE > sp | | | |
| 02FF(03ff) | | | | |
| 03FO- | EXTERNAL DECODE > FD | | | |
| 03F7 | | | | |
| 0020 | INTERRUPT CONTROLLER #1 | | | |
| 0021 | INTERRUPT CONTROLLER #1 | | | |
| 0040 | COUNTER - TIMER #0 | | | |
| 0042 | COUNTER - TIMER #2 | | | |
| 0043 | COUNTER - TIMER CONTROL WORD | | | |
| 0044 | COUNTER - TIMER #3 | | | |
| 0047 | COUNTER - TIMER CONTROL WORD | | | |
| 0060 | EXTERNAL DECODE > KEYBOARD | | | |
| 0061 | BIT 7 | BIT 6 | BIT 5 | BIT 4 |
| | cir int 0 | | | |
| | BIT 3 | BIT 2 | BIT 1 | BIT 0 |
| | io ck enan | m par enan | spkr ena | c-t 2 gate |
| Reg. | Bits 7-0 | | | |
| 0064 | EXTERNAL DECODE > KEYBOARD | | | |
| 0070 | nmi enan EXTERNAL DECODE > REAL TIME CLOCK/RAM | | | |
| 0071 | EXTERNAL DECODE > REAL TIME CLOCK/RAM | | | |
| 0074 | EXTERNAL DECODE > RAM ADDRESS(LOWER) | | | |
| 0075 | EXTERNAL DECODE > RAM ADDRESS(UPPER) | | | |
| 0076 | EXTERNAL DECODE > RAM DATA | | | |
| 0091 | | | | |
| | BIT 7 | BIT 6 | BIT 5 | BIT 4 |
| 0092 | litea | liteb | | |
| 0094 | mb setupn | | vga setupn | |
| 0096 | ch rst | | | |
| | BIT 3 | BIT 2 | BIT 1 | BIT 0 |
| 0092 | psswd lock | | a20 gate | alt pro rst |
| 0094 | | | | |
| 0096 | ch setup en | ch su 2 | ch su 1 | ch su 0 |
| Reg. | Bits 7-0 | | | |
| 00A0 | INTERRUPT CONTROLLER #2 | | | |
| 00A2 | INTERRUPT CONTROLLER #2 | | | |
| 0101 | | | | |
| | BIT 7 | BIT 6 | BIT 5 | BIT 4 |
| 0102 | pp mode | pp sel 1 | pp sel 0 | pp ena |
| 0103 | | | | |
| | BIT 3 | BIT 2 | BIT 1 | BIT 0 |
| 0102 | sp dec sel | sp ena | fd ena | mb ena |
| 0103 | | | fast ref | ram en |
| Reg. | Bits 7-0 | | | |
| 0278(0378/03bc) | PAR PORT DATA | | | |
| 0279(0379/03bd) | | | | |
| | BIT 7 | BIT 6 | BIT 5 | BIT 4 |
| 027a(037A/03be) | | ppread | irqena | ppselout |
| | BIT 3 | BIT 2 | BIT 1 | BIT 0 |
| | ppinitn | ppautofd | ppstrobe | |
| Reg. | Bits 7-0 | | | |
| 02F8(03f8)- | EXTERNAL DECODE > SP | | | |
| 02FF(03ff) | | | | |
| 03FO- | EXTERNAL DECODE > FD | | | |
| 03F7 | | | | |

Figure 3A:
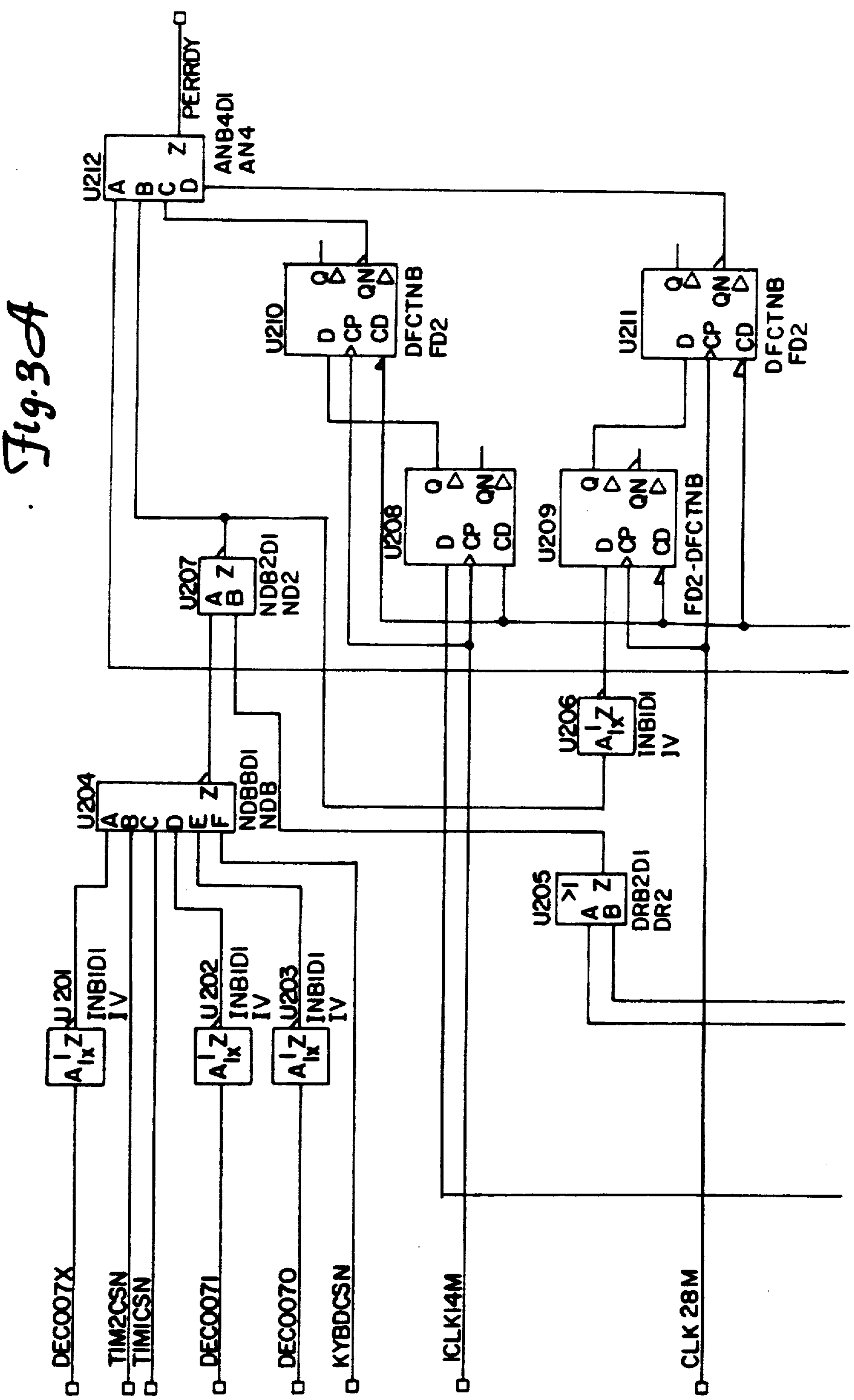
FIGS. 3A and 3B are circuit diagrams of components of the command processing section of the microcomputer peripheral device controller of FIG. 1 for producing the control signals of FIG. 2B.
Figure 3A:
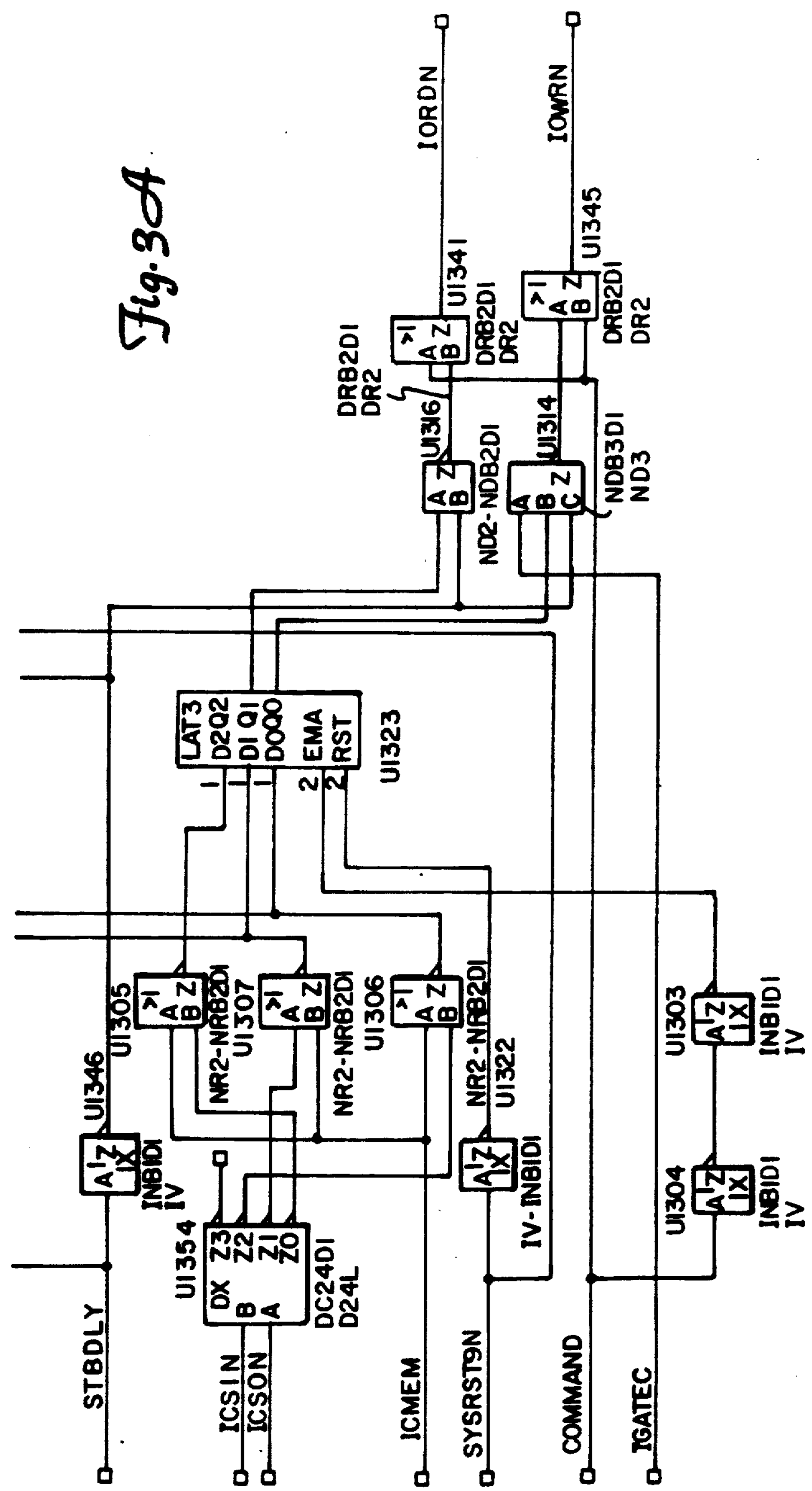
Figure 3B:
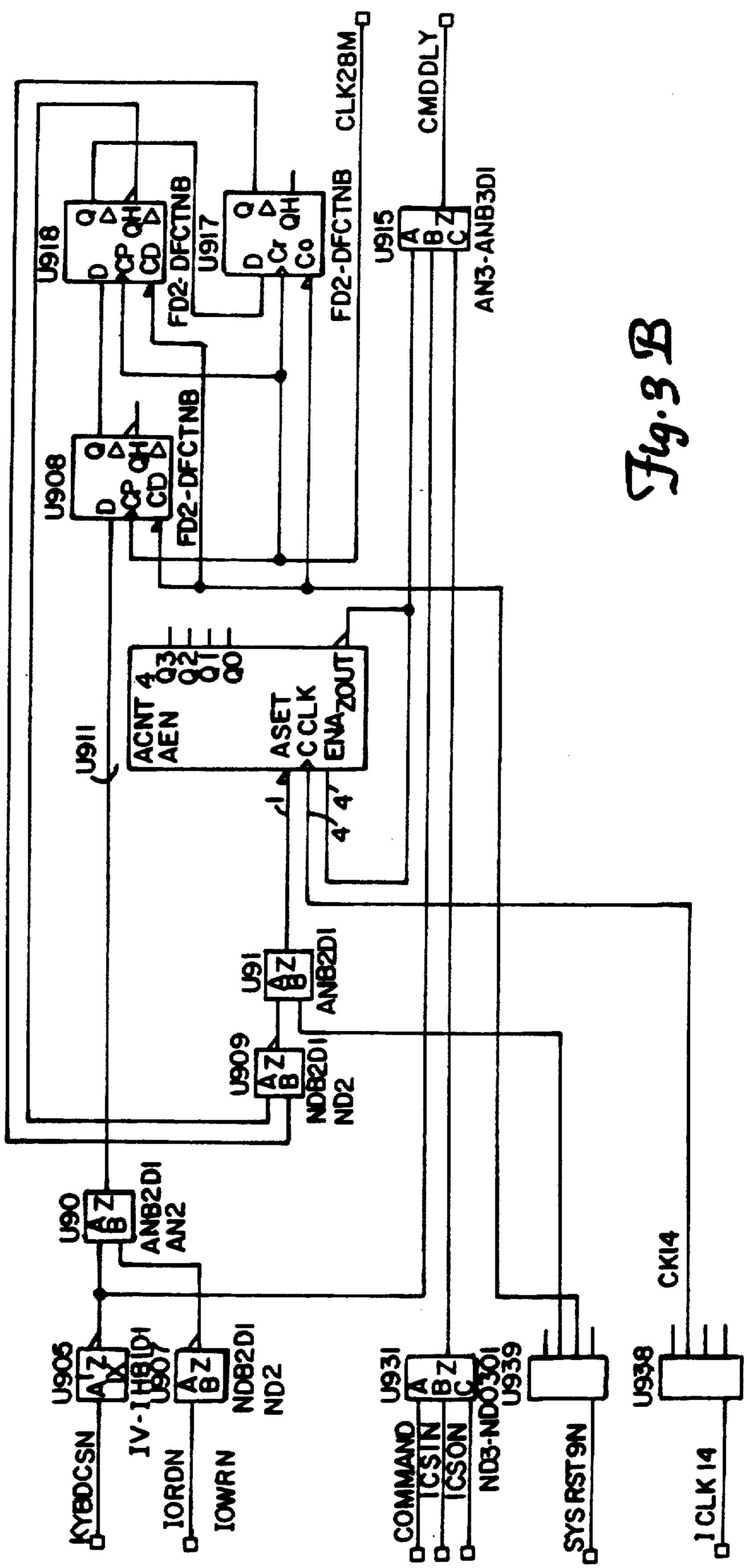

Peripheral device controller 10 produces the control signals shown in FIG. 3B in response to MCA control signals 15 from the MCA and interrupt signals 17 from the microprocessor (not shown), employing address information decoded by address decoding section 101. Address decoding section 101 decodes address bits A0-A9 according to the register definitions given in Table 2.

Address bits A10-A15, which are combined elsewhere in the microcomputer system, must be all zero for addressing registers in the preferred embodiment of the present invention.

Command processing section 102 processes MCA bus signals S0, S1, MEM and CMD. These signals are decoded, interpreted, latched and strobed to produce IORDN and IOWRN control signals. The output of command processing section 102 is coupled to timer section 103 and interrupt control sections 104 and 105.

Timer section 103 comprises audio timer 103A, system internal timer 103B and watchdog timer 103C. Control signals produced by this section are transmitted to master and slave interrupt sections 104 and 105, and to parallel printer port 106. Audio timer 103A comprises a counter similar in function to part no. 8254, manufactured by Intel Corporation. System timer 103B also comprises the same type of counter. Both timers 103A and 103B are 16-bit programmable counters. Finally, watchdog timer 103C comprises an 8-bit programmable counter which is a modified functional subset of timers 103A and 103B.

Master interrupt control section 104, the input of which is coupled directly to the microprocessor, comprises an interrupt controller which is functionally similar to part no. 8259, also manufactured by Intel Corporation. Slave interrupt control 105, coupled to master interrupt controller 104, also comprises an interrupt controller functionally similar to part no. 8259.

Parallel printer port 106 provides control signals to parallel printer devices and bidirectional data ports with such devices. Parallel printer port 106 includes a status port for receiving the status of the printing device attached thereto. Bit assignments for the port are given in Table 3.

TABLE 3

| PIN DEFINITION: | |
|---|---|
| 4.1 - CPU AND BUS CONTROLLER INTERFACE | |
| ALTRCN: Alternate Processor Reset. | This output goes to the Bus Controller to direct that the CPU be reset without resetting the entire system. This signal reflects the status of bit 0 in the register at address 0092H. |
| HOLDA: Hold Acknowledge. | This input signal from the CPU indicates that the CPU has entered the hold state. |
| INTR: Interrupt Request. | This active high output signals the CPU that an interrupt is pending. |
| NMIN: Non-Maskable Interrupt. | This active low output indicates that a non-maskable interrupt is pending. |
| RAMENA: RAM Enable. | This output signal indicates whether the system RAM should be enabled. The status of this line is indicated in bit 0 of the register at address 0103H. |
| 4.2 - MICROCHANNEL INTERFACE | |
| GATEC: Gate Command. | Input which is internally ANDed with CMD to generate IOWR. Can be used to delay the leading edge and/or hasten the trailing edge of the IOWR signal if required in the system design. |
| CA9–CA0: Address Bus. | These input signals are the low-order bits of the address bus. |
| CAUPPERN: Address Bus Upper Bits. | This active low input signal indicates that the address bits CA15–CA10 are all 0, which is the range for addressing the registers in the Peripheral Controller. |
| CCMDN: Channel Command. | This active low input signals that the address lines on the MicroChannel are valid and instructs the devices connected to the bus to respond accordingly. |
| CD7–CD0: Channel Data Bus. | These bi-directional lines are the MicroChannel data bus. |
| CDRSTN: Channel Reset. | This active low output signal is used as a reset to the channel. |
| CDSELFBK: Card Selected Feedback. | This input signal indicates that a memory slave or I/O slave is present at the address output by the system CPU. |
| CIOCHKN: I/O Channel Check. | This active low output signal is used to indicate a serious system error condition. |
| CMEM: Memory I/O. | This input signal indicates whether the current MicroChannel operation is a memory cycle (set to 1) or an I/O cycle (set to 0). |
| CS1, CS0: These input signals indicate the status of the current | |

TABLE 3-continued

PIN DEFINITION:

| CMEM | CS1 | CS0 | OPERATION |
|---|---|---|---|
| 0 | 0 | 0 | Interrupt Acknowledge |
| 0 | 0 | 1 | I/O Write |
| 0 | 1 | 0 | I/O Read |
| 0 | 1 | 1 | Reserved |
| 1 | 0 | 0 | Reserved |
| 1 | 0 | 0 | Memory Write |
| 1 | 1 | 0 | Memory Read |
| 1 | 1 | 1 | Reserved |

| | |
|---|---|
| PERRDY: Peripheral Controller Ready. | This handshaking signal to the MicroChannel indicates that the Peripheral Controller has accepted the signals sent to it. |
| CREFRESHN: Channel Refresh. | Indicates that a refresh operation is currently underway. |

4.3 - PERIPHERAL INTERFACE

| | |
|---|---|
| CDSU2, CDSU1, CDSU0: Card Setup. | These signals are used with a 3:8 decoder to select one of eight card slots. The CDSUx lines are the encoded slot number. These lines are copies of the appropriate bits of the register at address 0096H. |
| CDSUENA: | This signal indicates the validity of the CDSUx card select lines. It would normally be used to enable the external card selection decoder. |
| IORDN: I/O Read. | This active low output indicates to the peripheral devices that the current cycle is a read operation. |
| IOWRN: I/O Write. | This active low output indicates to the peripheral devices that the current cycle is a write operation. |
| IRQ0N, IRQ1N, IRQ3N-IRQ15N: Interrupt Inputs. | These active low input signals are the external interrupts. |
| PP7-PP0: Parallel Port Interface. | These bi-directional lines connect to the parallel (printer) port data lines. |
| PPACKN: Parallel Port Acknowledge. | This active low input indicates that the printer has received the last character and is ready to receive another one. This line is read in the parallel port status register at bit 6. |
| PPAFDN: Parallel Port Automatic Feed. | This bi-directional signal indicates whether a line feed should follow after each carriage return (set to The status of this line is indicated in bit 1 of the parallel port control register. |
| PPBUSY: Parallel Port Busy. | This active low input indicates that the parallel port is busy. The status of this line is indicated in bit 7 of the parallel port status register. |
| PPERN: Parallel Port Error. | This active low input indicates that there is an error condition in the device on the parallel port. The status of this line is indicated in bit 3 of the parallel port status register. |
| PPINITN: Initialize Parallel Port. | When this line is set to 0, the parallel port device is activated. The line is controlled by bit 2 of the parallel port control register. |
| PPPAEND: End of Paper. | This input indicates that the printer on the parallel port is out of paper. The status of this line is indicated in bit 5 of the parallel port status register. |

TABLE 3-continued

| PIN DEFINITION: | |
|---|---|
| PPSELN: Parallel Port Selected. | This active low input indicates that the device on the peripheral port acknowledges that it has been selected. The status of this line is indicated in bit 4 of the parallel port status register. |
| PPSELON: Parallel Port Select. | This active low output selects the parallel port device. The status of this line is indicated in bit 3 of the parallel port control register. |
| PPSTBN: Parallel Port Strobe In. | This input indicates the status of PPSTBOUT in bit 9 of the parallel port control register. |
| PPSTBOUT: Parallel Port Strobe Out. | This active high output clocks data to the parallel port. |
| PARPEN: Parallel Port Enable. | Controls the direction of the external parallel port transciever. |
| SERPIRQ: Serial Port Interrupt Request. | Programmable inside the chip for the interrupt number. |
| SERPOUT2: Gate for the serial port interrupt. | Companion signal for the interrupt request from the external USART. Both this signal and the interrupt request must be active to cause an interrupt. |
| 4.4 - OTHER | |
| AUDIO: Audio signal output. | This is the output of the audio timer. |
| CLK14M: 14 MHz clock. | This input signal drives the internal logic in the circuit. |
| TIMCLK: 1.19 MHz Clock. | This output is derived from the 14 MHz clock. |
| CLKIM: | 1.19 MHz clock input used internally for the timer tick. |
| SYSTIC: System Timer Tic. | This output goes to interrupt zero. |
| SYSRSTN: System Reset. | This input resets the chip. |
| RD0101N: Read Port 0101H. | Decode of the port address ANDed with the IORD signal. |
| RD0103N: Read Port 0103H. | Decode of the port address ANDed with the IORD signal. |
| RD0076N: Read port 0076H. | Decode of the port address ANDed with the IORD signal. |
| WR0074: Write Port 0074H. | Decode of the port address ANDed with IOWR. Note that this signal is active high to be used with a latch rather than an edge triggered register. |
| WR0075: Write Port 0075H. | Decode of the port address ANDed with IOWR. Note that this signal is active high to be used with a latch rather than an edge triggered register. |
| WR0076N: Write Port 0076H. | Decode of the port address ANDed with IOWR. |
| IRQSEL: | Selects either latched or unlatched versions of some of the interrupt lines. Must be pulled high during normal system operation. |
| MOUSEINT: Mouse Interrupt. | Input from the system board supported pointing device. Normally would come from the 8042. |
| INCDEC: Incomplete Decode. | When this input is high, it allows incomplete decodes of the selected IO ports in order to allow exact compatibility. If low, it forces exact decodes. |
| DBENAN: Data Bus Enable. | This active-low output provides the enable signal to the buffers for the data bus between the Peripheral Controller and the MicroChannel. |

TABLE 3-continued

| PIN DEFINITION: | |
|---|---|
| DEC010X: Decode Addresses 010X. | This output is asserted when an I/O address in the range 0100H–0107 is selected. These addresses represent the registers used for the Programmable Option Select (POS) |
| FASTREFN: Fast Refresh Select. | Comes from the programmable port and goes to the DMA chip to indicate that fast refresh mode is active. Causes an 835 ns refresh period rather than the normal 15 microsecond period. |
| IOOUTN: | Controls system buffer chips when an I/O write cycle is in progress. |
| FDCPCSN: Floppy Disk Select. | This output is asserted when an I/O address in the range 03F8H-93FFH is selected. This address range corresponds to the space for the floppy disk. |
| FDACKN: Floppy Disk Acknoweldge. | Input which controls the buffer when a DMA cycle for transfer of floppy disk data is in progress. |
| KYBDCSN: Keyboard Select. | This output is asserted when an I/O address 0060H or 0064H is selected. These addresses correspond to the space for the keyboard. |
| CMDDLY: | Output of the delay for the keyboard read. Provides the necessary recovery time for this slow peripheral device. Normally paired with STBDLY input. |
| STBDLY: | Input for the keyboard access recovery time. Normally connected to CMDDLY. |
| LITEAN, LITEBN: Light Drivers. | These active low outputs are used to control the fixed disk activity light drivers. These signals correspond to bits 7 and 4 of the register at address 0092H. |
| MPCENA: Memory Parity Check Enable. | This output signal indicates that the memory parity check information is to be used. |
| MPCKN: Memory Parity Check. | This active low input indicates the results of the memory parity check. This signal is a 0 when a memory parity error occurs. |
| PASSA20: System Control Port A, bit 1. | This bit can be used to control address bit A20. |
| POSENA: POS Setup Enable Register Bit 7. | This active high output signal is bit 7 of the System Board Setup Enable Register (I/O Address 0094). |
| RTCAS: | Real-Time CMOS RAM Address Strobe: This output strobes the address to the real-time CMOS RAM. |
| RTCDS: | Real-Time CMOS RAM Data Strobe: This output strobes data to the real-Time CMOS RAM. |
| RTCRD: | Real-Time CMOS RAM Read/Write. This output signal controls the real-time CMOS RAM data direction during data accesses. |
| SERICSN: Serial Port 1 Decode. | This output is asserted when I/O addresses 03F8–03FF are selected. These addresses correspond to the space for the serial port. |
| TESTN: Test Input. | This input is used for functional testing of the circuit and is not used in the system operation. |
| VGASETN: Set up VGA. | This active low output directs |

TABLE 3-continued

| PIN DEFINITION: |
|---|
| the VGA circuit into the setup mode. This signal reflects the status of bit 5 of the register at address 0094H. |
| 4.5 - MISCELLANEOUS |
| VDD: Power. |
| VSS: Ground. |
| Reserved: Reserved for future use. Must not be used in system. |
| NC: No connection. |

Parallel printer port 106 comprises control and data latches for interfacing to various printer interfaces, including the centronics-type interface, in response to read status information received from such interfaces.

With continuing reference to FIG. 1, bus interface 107 comprises gating and multiplexing necessary to control the data path within the controller of the present invention for receiving and processing data, address, and control signals from the MCA. Finally, register section 108 comprise 8 registers, R61, 70, 91, 92, 94, 96, 102 and 103. These registers comprise registers of varying data width, and are used for controlling and configuring various system parameters.

Figure 2A:
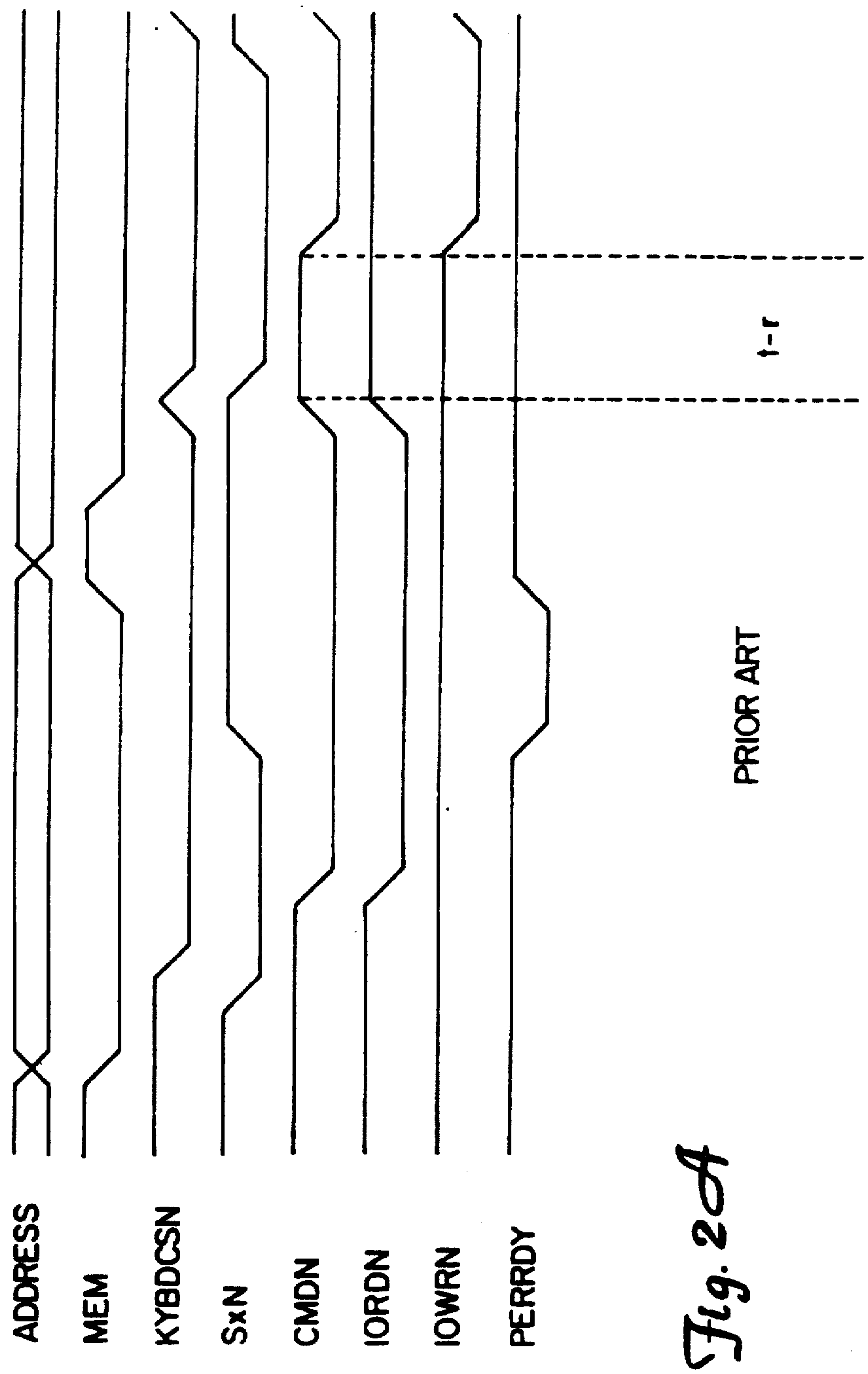
FIG. 2A is a timing diagram for control signals received and produced by a prior art microcomputer peripheral device controller.
Figure 2B:
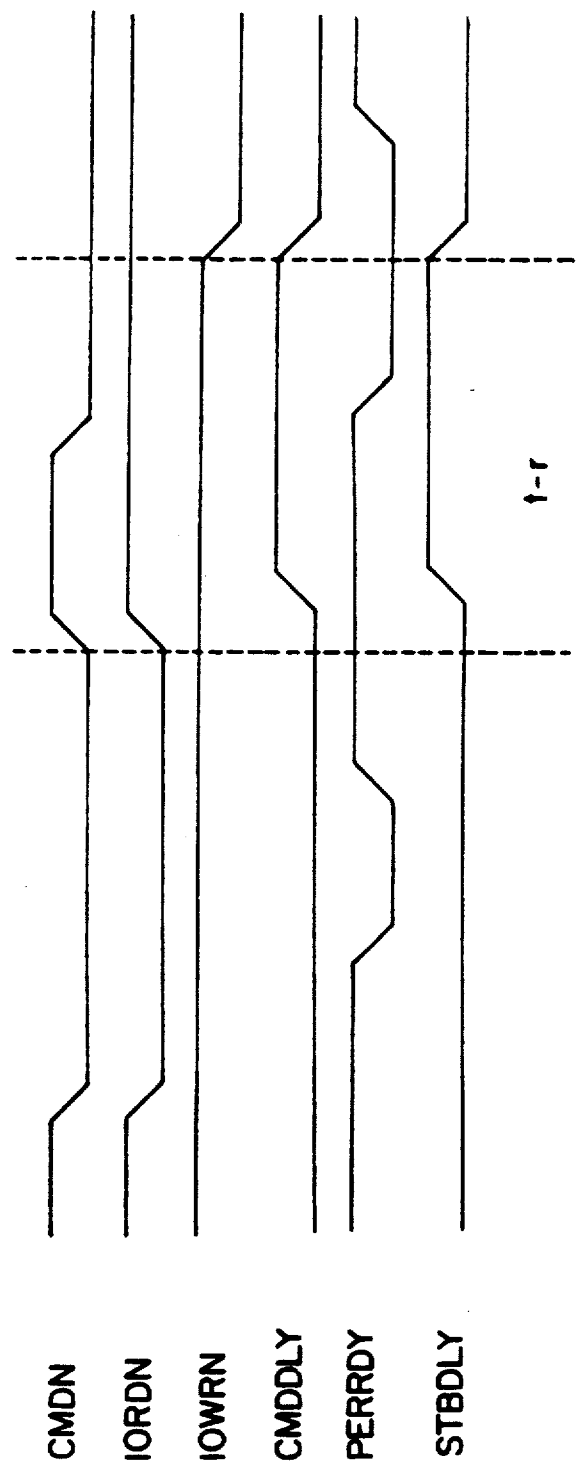
FIG. 2B a timing diagram for control signals received and produced by the microcomputer peripheral device controller of FIG. 1.

FIGS. 2A and 2B compare the control signals and their relationships produced by prior art peripheral device controllers with control signals and their relationships produced by the controller of the present invention. In FIG. 2A, MCA bus control signals ADDRESS, MEM, SxN and CMDN are processed into IORDN, IOWRN, and KYBDCSN for a keyboard access according to the prior art. Since this figure shows typical prior art operation of the bus and the signals derived from the bus, the function is shown as if there were no access recovery time compensation at all. Thus, none of the recovery times, designated "t-r", are modified or extended.

FIG. 2B shows the operation of two "back-to-back" MCA accesses to the keyboard controller with the recovery time circuit of the present invention in operation. Typically, the minimum recovery time between any two consecutive MCA bus operations is 100 ns. The recovery time required by the keyboard controller is 1000 ns minimum.

Recovery times, also designated "t-r" in FIG. 2B, are modified or extended according to the present invention by activating the STBDLY signal. In operation, the recovery time compensation circuit senses when the MCA bus access to the keyboard controller has ended and uses this information to start a counter. The counter will count by a selectable amount which relates to the specific amount of recovery time required by the peripheral device of interest, in this case, 1000 ns. At the end of this time, the IORDN or IOWRN signal will be generated. The command signal CMDN, must remain active during this entire time. Thus, the PERRDY signal must be generated to assure that the command signal remains active, and the MCA bus cycle is not terminated too soon.

Referring now to FIG. 3A, the PERRDY signal is produced by circuit components U201–U212 as shown. PERRDY effectively extends the duration of the CMDN strobe on the MCA bus. The PERRDY signal is also generated by U208, 210 and 212 when the STBDLY signal is active. Thus, the CMDN signal will be stretched or extended for as long as STBDLY is active.

With reference to FIG. 3B, flip-flops U908, 918 and 917 sense the end of an access controller signal, IORDN or IOWRN to the keyboard controller and initiates counter U911. Counter U911 will count until it reaches a preselected terminal count value which then indicates to the system that the keyboard controller is ready to process another access operation. Since CMDDLY signal is tied directly to and follows the STBDLY signal, the IORDN or IOWRN access to the keyboard controller will be allowed. Thus, as long as STBDLY signal is active, premature IORDN or IOWRN access to the keyboard controller is prohibited. The STBDLY signal may be connected externally to the CMDDLY output, or driven by another signal relating to a different peripheral device.

A detailed functional specification of a peripheral device controller constructed according to the preferred embodiment of the present invention is given in Exhibit A hereto, which is incorporated by reference herein. While preferred forms and arrangements have been described with reference to the drawing for illustrating the invention, it should be understood that such illustrations should not be taken as limitations on the invention. Various changes in and modifications of detail and arrangement may be made by designers of ordinary skill in the art without departing from the spirit and scope of this disclosure or the claimed invention. The features and advantages of the present invention may be employed in any microcomputer system desired.

We claim:

1. An apparatus for interfacing at least one peripheral device and a central processing unit in a computer system wherein the central processing unit and the peripheral device are coupled for communication through an input/output (I/O) bus, said apparatus comprising:

controller means, coupled to the I/O bus and the peripheral device, for controlling data flow and address and data timing between said peripheral device and said central processing unit via said input/output bus;

said controller means including access recovery means, coupled to said I/O bus and said peripheral device, for compensating for differences in access recovery times among said peripheral device, said central processing unit and said input/output bus wherein said access recovery means includes sensing means, coupled to said I/O bus, for sensing when an access operation via said input/output bus to the peripheral device has ended and for producing a first signal in response thereto, wherein said access recovery means further includes compensation means, coupled to said sensing means, for determining an amount of compensation time required to compensate for said differences in access recovery times based on said first signal; and means, coupled to said compensation means and said I/O bus, for modifying input/output bus control signals based on the amount of compensation required.

2. An apparatus as in claim 1 wherein said means for determining the amount of compensation required comprises:

counting means having a preselectable terminal count value, said counting means being initiated in response to said first signal.

3. An apparatus as in claim 1 wherein said means for modifying includes means for extending the duration of input/output bus control signals.

4. An apparatus for controlling timing between access cycles performed on a peripheral device by a control device, the peripheral device and the control device being coupled to an input/output (I/O) bus and communicating through the I/O bus, the apparatus comprising:

access control means, coupled to the I/O bus and the peripheral device, for receiving access command signals, representative of a desired peripheral access cycle, from the control device through the I/O bus and for providing access control signals to the peripheral device based on the access command signals to control the desired access cycle;

cycle detection means, coupled to the access control means, for detecting the end of a previous access cycle performed on the peripheral device and for providing an end signal indicative of the end of the previous access cycle; and timing control means, coupled to the access control means and the cycle detection means, for detecting an amount of time since the end of the previous access cycle, and for causing the access control means to delay providing the access control signals for a next desired access cycle until the time since the end of the previous access cycle has reached a desired recovery time period.

5. The apparatus of claim 4 wherein the timing control means further comprises:

stretching means, coupled to the access control means, for detecting the access command signals and for stretching the access command signals to a desired length of time.

6. The apparatus of claim 4 wherein the timing control means comprises:

counter means, coupled to the cycle detection means, for receiving the end signal and for counting, in response to the end signal, to a recovery count; and means, coupled to the counter means and the access control means, for providing a count signal, indicative of the count of the counter means, to the access control means so that the access control means delays providing the access control signals for the next desired access cycle until the counter means has counted to the recovery count.

7. The apparatus of claim 6 wherein the counter means is programmable to count to a variable recovery count, depending on the desired recovery time.

8. A method of controlling access cycles performed on a peripheral device by a control device wherein the peripheral device is coupled to the control device through an input/output (I/O) bus and wherein the control device provides access command signals to the I/O bus indicative to a desired access cycle to be performed, the method comprising:

receiving the access command signals from the I/O bus;

generating access control signals, based on the access command signals;

providing the access control signals to the peripheral device to perform the desired access cycle;

detecting the end of a previous access cycle performed on the peripheral device;

determining time that has elapsed since the end of the previous access cycle; and delaying the steps of generating and providing until the time that has elapsed since the end of the previous access cycle reaches a desired recovery time.

9. The method of claim 8 and further comprising:

stretching the access command signals to a desired minimum time period.

10. The method of claim 8 wherein determining time comprises:

counting a number of clock pulses, having a frequency, when the end of the previous access cycle has been detected.

11. The method of claim 10 wherein delaying comprises:

detecting when the number of clock pulses counted reaches a desired recovery count corresponding to the recovery time; and delaying the steps of generating and providing until the number of clock pulses counted reaches the desired recovery count.

12. The method of claim 8 wherein detecting comprises:

detecting the end of the previous access cycle based on the access command signals.

13. The method of claim 8 wherein detecting comprising:

detecting the end of the previous access cycle based on the access control signals.

14. The method of claim 11 wherein delaying further comprises: preselecting the recovery count based on the frequency of the clock pulses and the desired recovery time.

15. An apparatus for controlling access cycles performed on a peripheral device by a control device wherein the peripheral device is coupled to the control device through an input/output (I/O) bus and wherein the control device provides access command signals to the I/O bus indicative of a desired access cycle to be performed, the apparatus comprising:

generating means, coupled to the I/O bus, for receiving the access command signals from the I/O bus and for generating access control signals based on the access command signals;

means, coupled to the generating means, for providing the access control signals to the peripheral device to perform the desired access cycle;

detecting means, coupled to the generating means, for detecting the end of a previous access cycle performed on the peripheral device;

timing means, coupled to the detecting means, for determining the time that has elapsed since the end of the previous access cycles; and delay means, coupled to the generating means, the means for providing the access control signals, and the timing means, for delaying the access control signals so that the desired access cycle is not performed on the peripheral device until the time that has elapsed since the end of the previous access cycle reaches a desired recovery time.

16. The apparatus of claim 15 and further comprising:

stretching means, coupled to the I/O bus, for stretching the access command signals to a desired minimum time period.

* * * * *